(12) United States Patent
Zock et al.

(10) Patent No.: US 11,618,389 B2
(45) Date of Patent: Apr. 4, 2023

(54) ADJUSTABLE GRAB BAR FOR UTILITY VEHICLES AND ASSOCIABLE CARRYING RACK

(71) Applicants: Richard Mellick Zock, Lapeer, MI (US); Miles John Zock, Lapeer, MI (US)

(72) Inventors: Richard Mellick Zock, Lapeer, MI (US); Miles John Zock, Lapeer, MI (US)

( * ) Notice: Subject to any disclaimer, the term of this patent is extended or adjusted under 35 U.S.C. 154(b) by 38 days.

(21) Appl. No.: 17/224,767

(22) Filed: Apr. 7, 2021

(65) Prior Publication Data

US 2021/0370839 A1 Dec. 2, 2021

Related U.S. Application Data

(60) Provisional application No. 62/971,597, filed on Feb. 7, 2020.

(51) Int. Cl.
*B60R 7/04* (2006.01)

(52) U.S. Cl.
CPC ..................... *B60R 7/04* (2013.01)

(58) Field of Classification Search
CPC ...................................................... B60R 7/04
See application file for complete search history.

(56) References Cited

U.S. PATENT DOCUMENTS

| | | | |
|---|---|---|---|
| 3,194,346 A * | 7/1965 | Stentz | B62B 5/049 293/118 |
| 9,272,654 B1 * | 3/2016 | Powell | B60P 3/073 |
| 2006/0192375 A1* | 8/2006 | Davis | B62D 23/005 296/205 |
| 2014/0346822 A1* | 11/2014 | Bachman | B62J 1/02 297/195.11 |
| 2016/0031357 A1* | 2/2016 | Collins | B62B 5/0404 280/783 |
| 2016/0174724 A1* | 6/2016 | Eskridge, III | A47C 20/04 5/613 |
| 2021/0245689 A1* | 8/2021 | Williams | B60S 1/66 |

* cited by examiner

*Primary Examiner* — Derek J Battisti
(74) *Attorney, Agent, or Firm* — Dunlap Bennett & Ludwig, PLLC

(57) ABSTRACT

An adjustable grab bar assembly for selectively adjusting the height of the grab bar, as well as a vehicular carrying rack having a cage frame with arms acting as side supports for engaging pre-existing, OEM or grab bars of the associated adjustable grab bar assembly.

6 Claims, 5 Drawing Sheets

ADJUSTABLE GRAB BAR FOR UTILITY VEHICLES AND ASSOCIABLE CARRYING RACK

CROSS-REFERENCE TO RELATED APPLICATION

This application claims the benefit of priority of U.S. provisional application No. 62/971,597, filed 7 Feb. 2020, the contents of which are herein incorporated by reference.

BACKGROUND OF THE INVENTION

The present invention relates to accessories for high-performance, crossover, traditional, military utility vehicles (UTV), all-terrain vehicles (ATV), motor bikes, dirt bikes and the like and, more particularly, a selectively adjustable rear grab bar for such vehicles as well as well as a carrying rack to operatively engage the grab bar for increasing the vehicles pay load.

Being able to lift the rear end of an UTV, ATV, motor bike or dirt bike may be critical when using or maintaining such vehicles. However, users/riders have different physical heights and strengths, and so prior art fixed-position grab bars may frustrate the purpose of the grab bar if not very suitable for shorter, younger riders compared to taller riders.

As can be seen, there is a need for a selectively adjustable rear grab bar for UTVs, ATVs, and motor/dirt bikes. The present invention is adapted to selectively adjust and secure the grab bar to different heights, by way of an adjustable grab bar assembly, at which different riders may feel comfortable lifting the rear end of the machine up. Furthermore, the setup of the present invention enables short users to lower the grab bar, and therefore be able to gain more leverage when lifting the rear end of the machine, lessening the likelihood of hurting themselves.

Separately, despite the cost savings associated with utilizing one's own utility vehicle when traveling (for leisure or hauling), such vehicles lack of storage space, limiting the items or payload capable of being transported by one's personal utility vehicle. Current vehicular carry racks for utility and all-terrain vehicles do not support much of a load, typically forcing owners to use another, more expensive means of transportation for travelling or, in the context of hauling freight, demanding multiple trips be made.

As can be seen, there is a need for a vehicular carrying rack embodying a grid-pattern framework having side support to operatively engage the vehicle's grab bar. The present invention has a luggage/storage/carrying rack of frame elements, (in certain embodiments round steel or aluminum bars) formed in a grid pattern. The rack provides side support that also secures and protects items inside the rack. The vehicular carrying rack may be top mounted with three or more arms that would fit to the existing, original equipment manufacturer (OEM) grab bar or alternative aftermarket replacement, such as disclosed herein.

Connectors, such as bungee cords, pull cords or tie down supports may be joined/welded to the side. Usable on an UTV, ATV, motor/dirt bike, scooter, go kart, golf cart, or other means of transport, the vehicular carrying rack allows people to place, store and carry so as to provide a large haul or payload, which in turn may obviate the need for making multiple trips or for paying for storage.

The present invention is larger and less expensive than the prior art, enabling a larger payload, transportation load, and storage than currently possible.

SUMMARY OF THE INVENTION

In one aspect of the present invention, an adjustable grab bar assembly including the following: at least one bracket, each bracket having a pivot point; and a plurality of bracket attachment points radially spaced apart relative to the pivot point.

In another aspect of the present invention, the adjustable grab bar assembly, wherein each bracket further includes: a first portion having the pivot point; and a second portion having the plurality of bracket attachment points, wherein the first portion is linear and wherein the pivot point is between a distal end and a proximal end of the first portion; and wherein the second portion is hook shaped having the plurality of bracket attachment points, wherein the second portion has a first turn and a second turn, wherein the first turn is approximately orthogonal (i.e., between 80 and 100 degrees) relative to said distal end, and wherein the second turn is between thirty and sixty degree relative a distal end of the first turn, the second turn turning towards said proximal end; one or more frame slots adjacent said proximal end, wherein each frame slot is elongated along a longitude axis of the first portion; a frame hole in a flange along an upper longitudinal edge of the first portion between the one or more frame slots and the pivot point; a grab bar arm operatively associated with each pivot point, wherein each grab bar arm has an arm attachment hole spaced apart from the pivot point in such a way that said arm attachment hole can be selectively secured in each of the plurality of bracket attachment points, whereby an angle of incident of the grab bar arm relative the bracket is selectively adjustable and securable; further including a spacer between the grab bar arm and the bracket at the pivot point and at the selected bracket attachment point of the plurality of bracket attachment points; and a grab bar connected to a distal end of the grab bar arm.

In yet another aspect of the present invention, a carrying rack for securing to a grab bar of a utility vehicle, the carrying rack including the following: a base frame defining a main opening; a grid framework defining an enclosure communicating with the main opening, wherein the enclosure extend in a first direction from the base frame; a plurality of support arms extending from the grid framework in the first direction; and a hand extending in the first direction from a distal end of each support arm; and a plurality of side supports extending from the base frame in a second direction orthogonal to the first direction, wherein each hand comprising two spaced apart flanges extending in the first direction.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Broadly, an embodiment of the present invention provides an adjustable grab bar assembly for selectively adjusting the height of the grab bar, as well as a vehicular carrying rack having a cage frame with arms acting as side supports for engaging pre-existing, OEM or grab bars of the associated adjustable grab bar assembly.

Referring to FIGS. 1 through 6, the present invention embodies a selectively adjustable grab bar assembly 100 for pivoting a grab bar 32 relative to a portion of the associated vehicle's frame. A pair of grab bar arms 28 may interconnect the grab bar 32 to the grab bar assembly 100, in certain embodiments, by way of a left bracket 10/40 and a right bracket 10/40.

Figure 1:
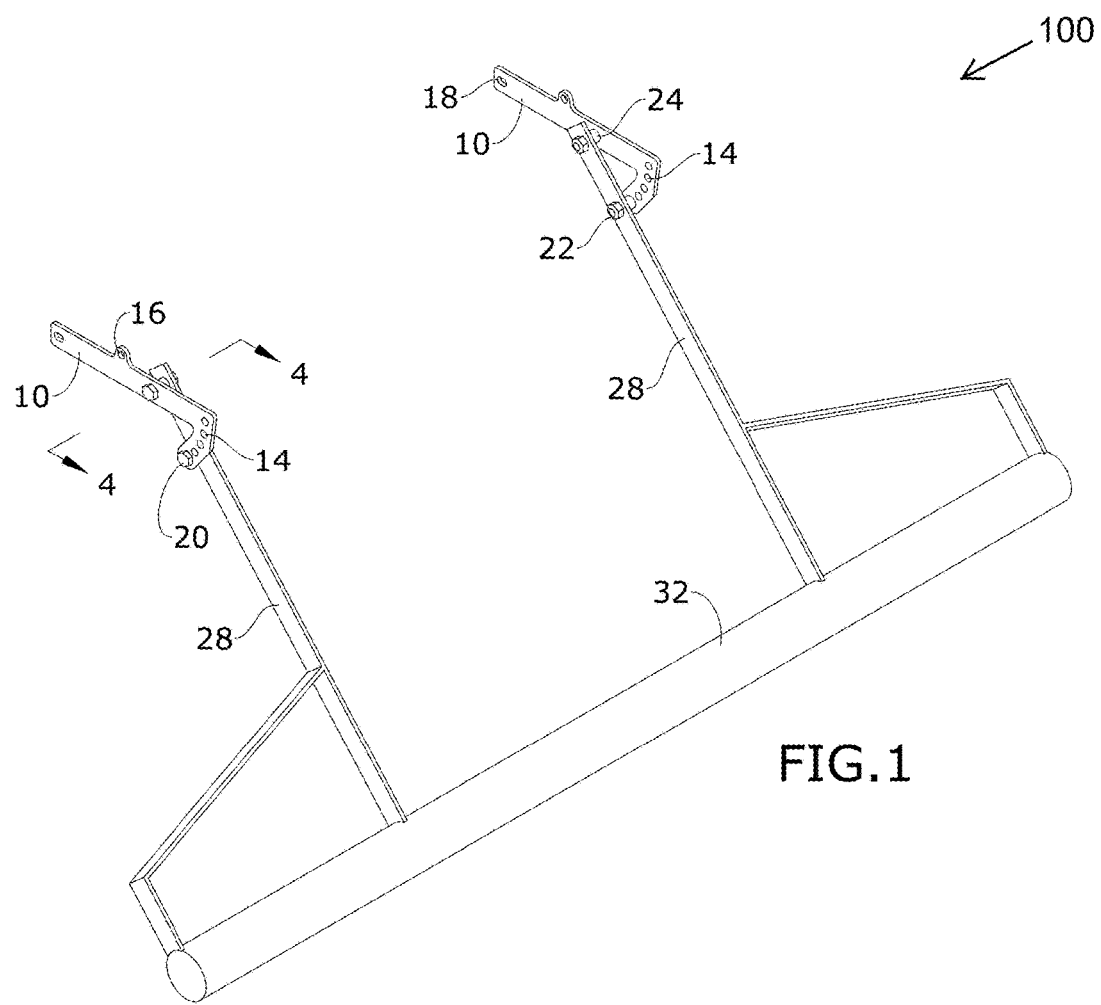
FIG. 1 is a perspective view of an exemplary embodiment of the present invention, illustrating installation of a set up of the grab bar assembly 100.
Figure 2:
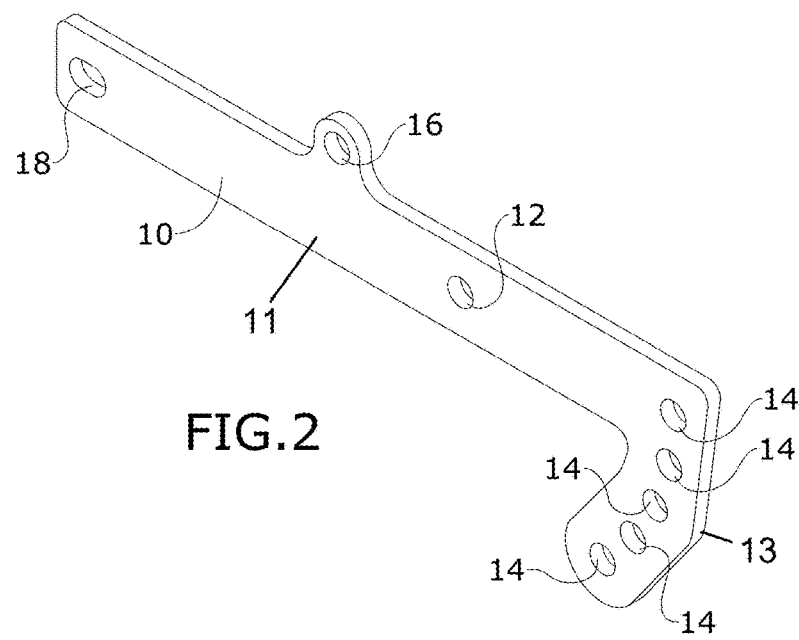
FIG. 2 is a perspective view of an exemplary embodiment of a single bracket of the present invention.

The grab bar 32 may be round steel or aluminum bars or other shapes and materials that are durable and convenient for a human user to grab. Each bracket 10/40 may be planar and have a first elongated linear portion 11 and a hook portion 13 that turns at approximately a right angle from a distal end of the linear portion 11, before (the hook portion 13) turn a second time between thirty and sixty degrees back toward a proximal end of the linear portion 11, as illustrated in FIG. 2. Along the hook portion 13 may be a plurality of spaced apart securing holes 14/44 therethrough.

Inward of the proximal end of the linear portion 11 may be one or more frame attachment slots 18/46 therethrough. Each frame attachment slot 18/46 may be elongated in a direction parallel to a longitudinal axis of the linear portion 11. Between the proximal end and the distal end of the linear portion 11 may be a frame attachment hole 16. The frame attachment hole 16 may be disposed in a flange along an upper longitudinal edge of the linear portion 11. Between the frame attachment hole 16 and the distal end of the linear portion 11 may be a pivot hole 12/42.

Figure 3:
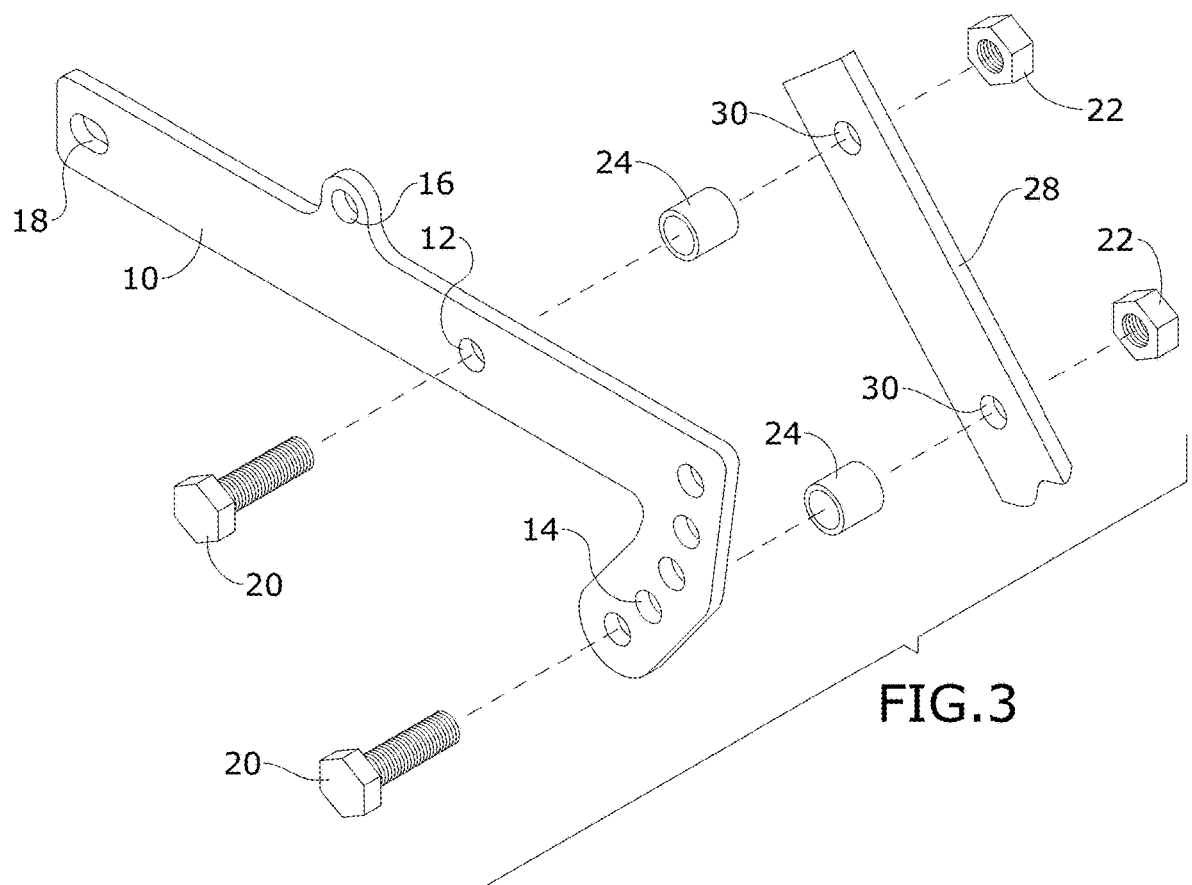
FIG. 3 is an exploded perspective view of an exemplary embodiment of the present invention.
Figure 4:
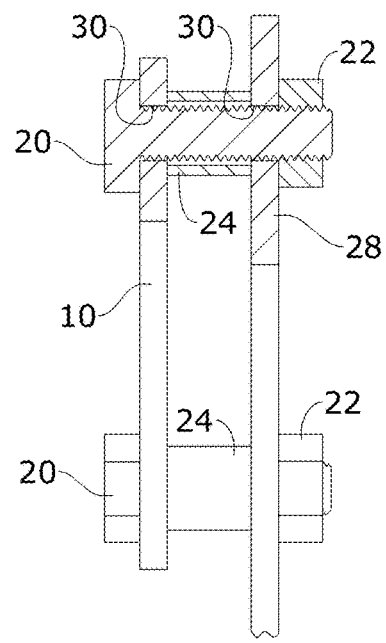
FIG. 4 is a section view of an exemplary embodiment of the present invention, take along line 4-4 in FIG. 1.

Referring to FIG. 3, each bracket 10/40 may connect to one of the pair of grab bar arms 28 at one or two attachment points. The first attachment point may engage a bolt 20, a nut 22, and a spacer 24 to connect the pivot hole 12/42 to a proximal end of the grab bar arms 28 by way of a proximal grab bar arms hole 30. The spacer 24 is between the pivot hole 12/42 and said grab bar arm hole 30. The second attachment point also may be a bolt 20, a nut 22, and a spacer 24 that connects one of the securing holes 14/44 of the hook portion with a more intermediate grab bar arms hole 30, wherein the spacer 24 is between securing holes 14/44 and the grab bar arm hole 30. The bolt 20, nut 22, and spacer 24 may be, but not limited to a grade 10 bolt, a grade 10 serrated locking nut, and an aluminum spacer, respectively.

A method of retrofitting the grab bar assembly 100 to an existing vehicle's frame may include using each bracket's frame attachment slot 18/46 and frame attachment hole 16, wherein the latter utilizes the frame's (not shown) bolt hole for the OEM grab bar. In certain embodiments, the bracket 40 may not have a frame attachment hole 16.

Figure 5:
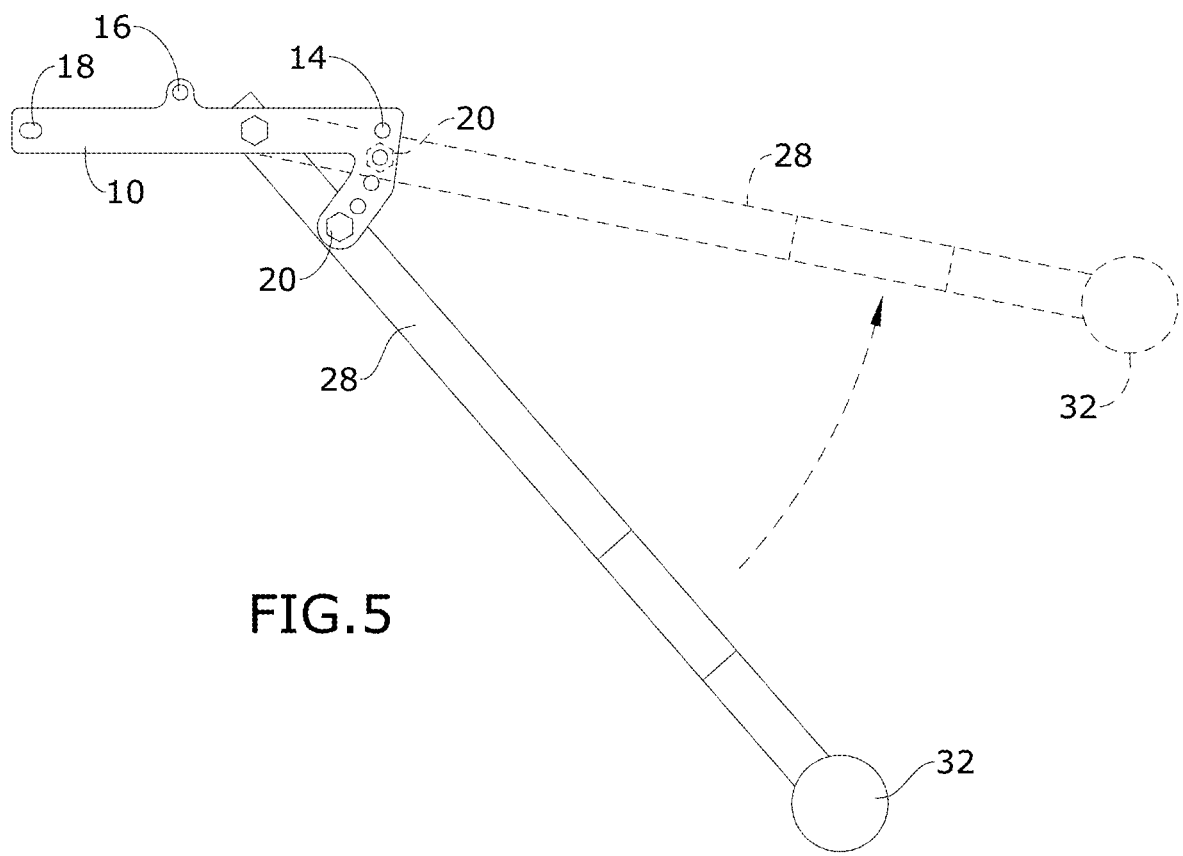
FIG. 5 is a side view of an exemplary embodiment of the present invention, illustrating the adjustable angle of the grab bar 32.
Figure 6:
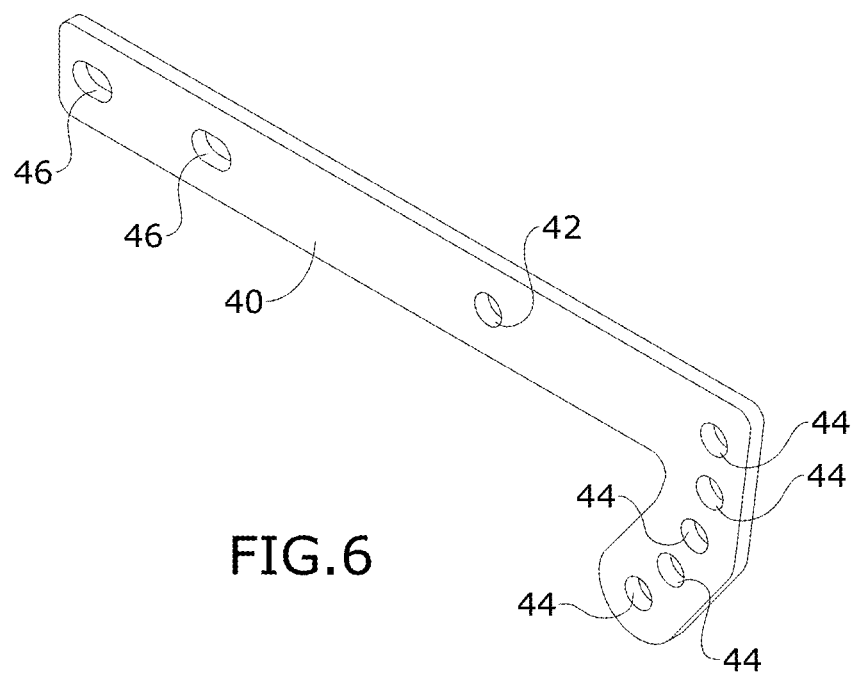
FIG. 6 is a perspective view of an exemplary embodiment of the present invention.

Referring the FIG. 5, the bracket 10/40, specifically the plurality of securing holes 14/44, allows the grab bar 32 to be selectively pivoted about the pivot/first attachment point 12/42 in such a way that the user may selectively secure the grab bar arm 28 (via its intermediate grab bar arm hole 30) with one of the plurality of securing holes 14/44 (through inserting the bolt 20, nut 22, and spacer 24 therethrough), thereby enabling the user to select and secure the desired angle of incident of the distal grab bar 32 relative to the frame of the vehicle. As mentioned above, the present invention allows the user to choose the best setting (height) of the grab bar 32, whereby after tightening the fasteners, the user may simply lift the rear end up of the vehicle using the grab bar 32.

Figure 7:
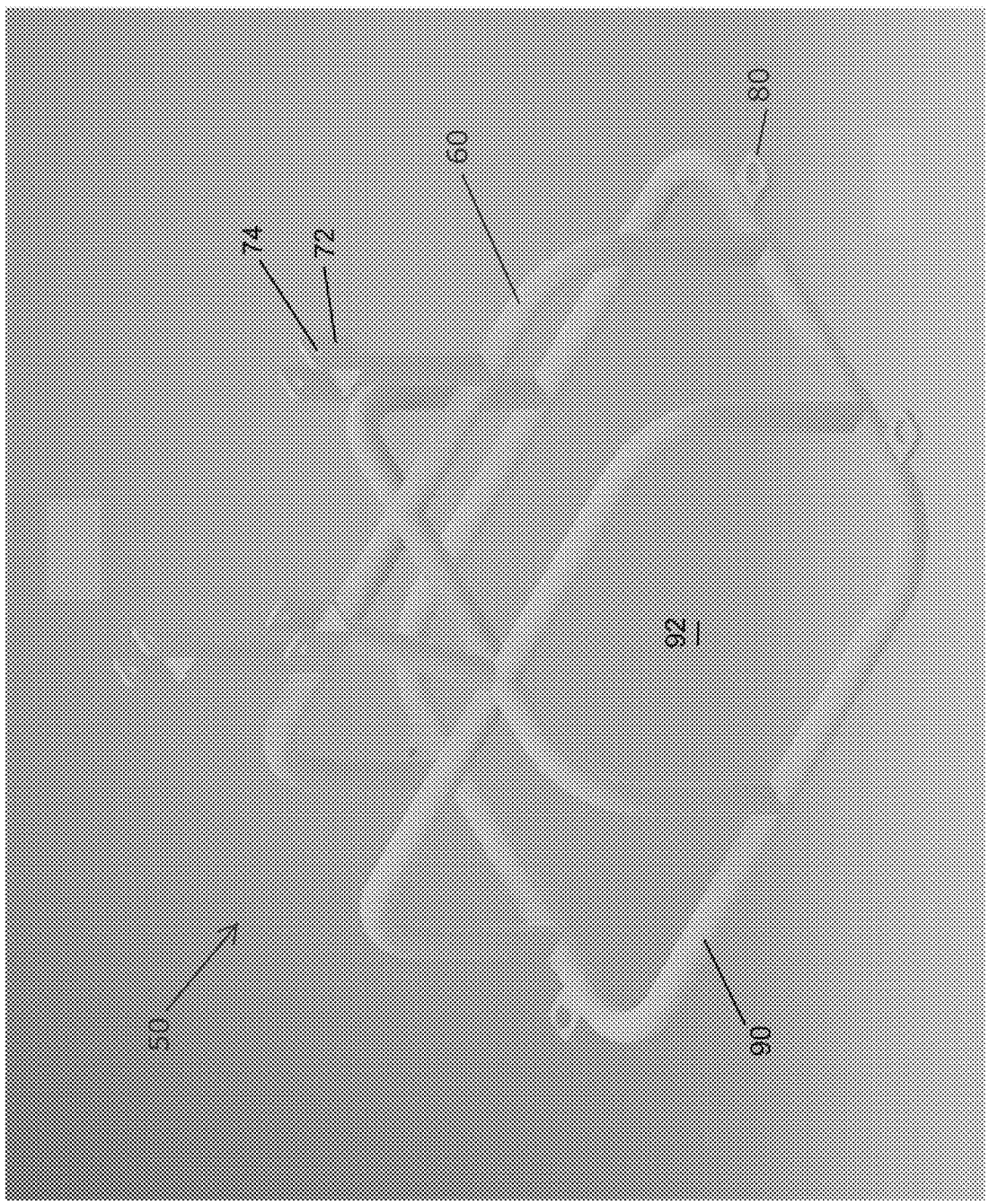
FIG. 7 is a perspective view of an exemplary embodiment of a carrying rack of the present invention.
Figure 8:
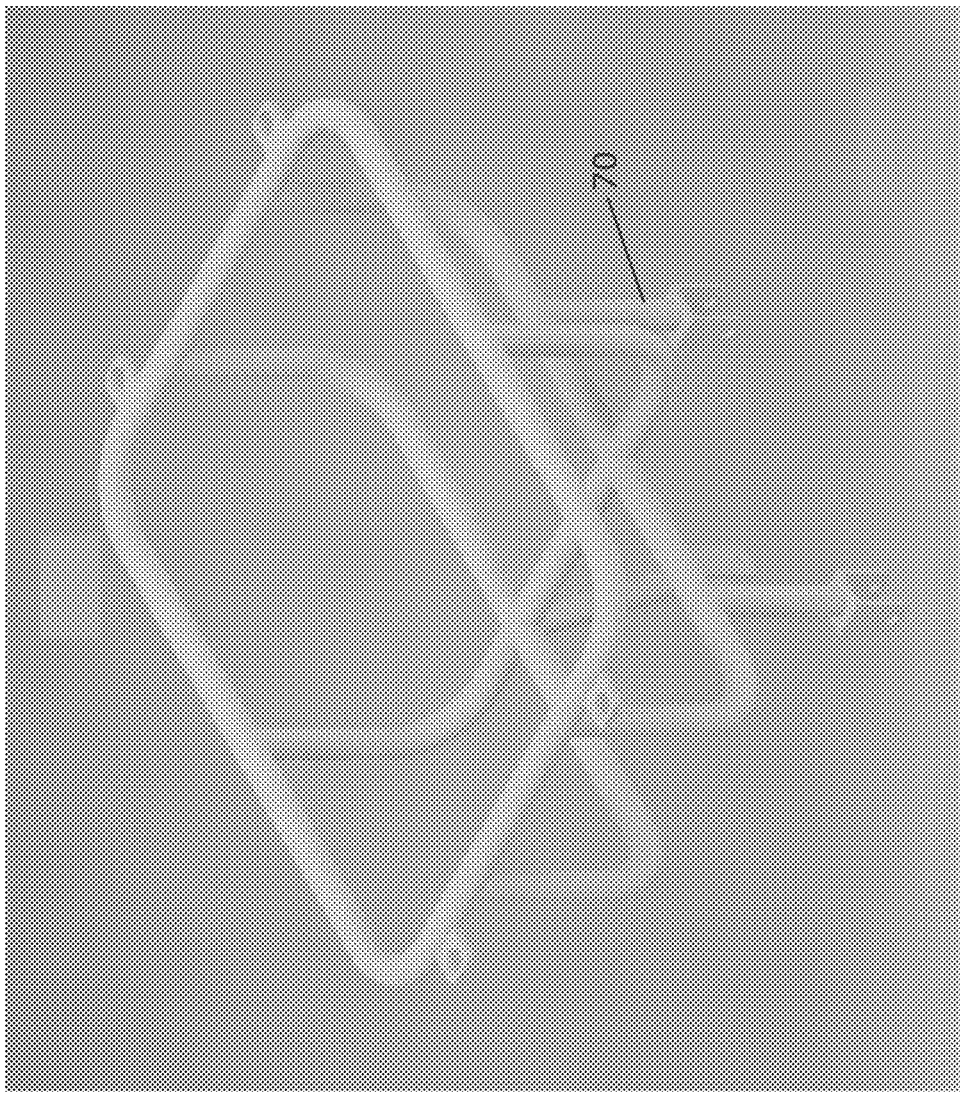
FIG. 8 is a perspective view of an exemplary embodiment of the carrying rack of the present invention.

Referring now to FIGS. 7 and 8, the present invention may include a vehicular carrying rack 50 providing room for luggage, storage and freight. A base frame 90 defines a main opening. The vehicular carrying rack 50 includes a framework 60 having round steel or aluminum bars, welded in a grid pattern, wherein the grid-pattern framework 60 defines an enclosure that communicates with the main opening 92. The grid-pattern framework 60 may provide support arms 70 extending away from the main opening, while the base frame 90 provides side supports 80 in a direction orthogonal to the volume of the enclosure defined by the grid-pattern framework 60. Fasteners for moving the carrying rack 10 between a locked and unlocked engagement with the underlying vehicle. Each support arm 70 may have "hands" 72 (or spaced apart flanges) for receiving a pull bar or a grab bar 32 therebetween. The flanges have a fastener through hole 74 for facilitating securing said pull bar/grab bar 32.

Specifically, the vehicular carrying rack 50 may be dimensioned and adapted to operatively associate with an existing OEM or aftermarket pull bar or the above-mentioned grab bar 32. The carrying rack 10 may be held into place with a bolt that slides into place and is tightened with a washer and nut or equivalent hardware. All the elements have a purpose to be used all together to achieve fitment and purpose.

The carrying rack 50 may be manufactured through designing the cage framework 60 using wire or other material to achieve the form of the product illustrated in FIGS. 7 and 8, for example by designing the rack on a computer program to visually see the layout and dimensions. Thereafter, the manufacturer would make the final product and supply samples for testing for any changes or alterations that are needed for the final production.

It should be understood, of course, that the foregoing relates to exemplary embodiments of the invention and that modifications may be made without departing from the spirit and scope of the invention as set forth in the following claims.

What is claimed is:

1. An adjustable grab bar assembly comprising: at least one bracket, each bracket a unitary construction comprising: a pivot point; and a plurality of bracket attachment points radially spaced apart relative to the pivot point, wherein the pivot point and the plurality of bracket attachment points are coplanar; wherein each bracket comprises: a first portion having the pivot point; and a second portion having the plurality of bracket attachment points; and wherein the first portion is linear and wherein the pivot point is between a distal end and a proximal end of the first portion; and wherein the second portion is hook shaped having the plurality of bracket attachment points, wherein the second portion has a first turn and a second turn, wherein the first turn is orthogonal relative to said distal end, and wherein the second turn is between thirty and sixty degrees relative a distal end of the first turn, the second turn turning towards said proximal end.

2. The adjustable grab bar assembly of claim 1, further comprising one or more frame slots adjacent said proximal end, wherein each frame slot is elongated along a longitude axis of the first portion.

3. The adjustable grab bar assembly of claim 2, further comprising a frame hole in a flange along an upper longitudinal edge of the first portion between the one or more frame slots and the pivot point.

4. The adjustable grab bar assembly of claim 2, further comprising:
   a grab bar arm operatively associated with each pivot point, each grab bar arm comprising:
   a proximal hole; and
   an intermediate hole, wherein the proximal hole connects to the pivot point in such a way that said intermediate hole is selectively secured in one of the plurality of bracket attachment points,
   whereby an angle of incident of the grab bar arm relative the bracket is selectively adjustable and securable.

5. The adjustable grab bar assembly of claim 4, further comprising a spacer between the grab bar arm and the bracket at the pivot point and at the selected bracket attachment point of the plurality of bracket attachment points so that the grab bar arm is equally offset from the first and second portions.

6. The adjustable grab bar assembly of claim 5, further comprising a grab bar connected to a distal end of the grab bar arm.

* * * * *